United States Patent [19] [11] Patent Number: 4,839,729
Ando et al. [45] Date of Patent: Jun. 13, 1989

[54] SOLID STATE IMAGE SENSOR

[75] Inventors: Fumihiko Ando; Junji Kumada; Yoshihiro Fujita; Hidetoshi Yamada; Kazuhiko Nakamura, all of Tokyo, Japan

[73] Assignees: Nippon Hoso Kyokai; Olympus Optical Co., Ltd., both of Japan

[21] Appl. No.: 186,225

[22] Filed: Apr. 26, 1988

[30] Foreign Application Priority Data

May 28, 1987 [JP] Japan .................. 62-129875

[51] Int. Cl.[4] ............... H04N 3/14; H04N 5/335; H01J 40/14
[52] U.S. Cl. ................. 358/213.16; 358/213.15; 358/163; 358/167; 358/225
[58] Field of Search .......... 358/213.15, 213.16, 358/211, 213.19, 163, 167, 166, 168, 336

[56] References Cited

U.S. PATENT DOCUMENTS 4,529,886  7/1985  Yokoyama et al. ........... 358/213.19
4,589,023  5/1986  Suzuki et al. ............... 358/213.16
4,635,120  1/1987  Ichinio ....................... 358/166
4,644,403  2/1987  Sakai et al. ................. 358/213.15

FOREIGN PATENT DOCUMENTS 52-122038 10/1977 Japan .

Primary Examiner—Jin F. Ng
Assistant Examiner—Mehdi Haghani
Attorney, Agent, or Firm—Arnold, White & Durkee

[57] ABSTRACT

A solid state image sensor including a light receiving section having a number of light receiving cells arranged in matrix, and a reading and storing section having a first set of switching and memory transistors for reading bright signals read out of light receiving cells arranged in a row and storing the same for a horizontal scanning period, a second set of switching and memory transistors for reading dark signals out of light receiving cells arranged in a row and storing the same for a horizontal scanning period, and a set of reading transistors for reading the bright and dark signals simultaneously out of the first and second sets of memory transistors for respective pixels successively. The light receiving section and the reading and storing section are formed integrally in the same semiconductor substrate. In order to remove the fixed pattern noise, there is derived differences between the simultaneously readout bright and dark signals with the aid of a differential amplifier.

11 Claims, 5 Drawing Sheets

FIG.1 _PRIOR ART_

SOLID STATE IMAGE SENSOR

BACKGROUND OF THE INVENTION

Field of the Invention and Related Art Statement

The present invention relates to a solid state image sensor comprising a light receiving section including a number of light receiving cells arranged in matrix and a signal readout section for reading an image signal out of the light receiving section, and more particular to a solid state image sensor in which fixed pattern noises can be reduced to a great extent by the simple construction.

In the solid state image sensor, noises are fixedly generated in an image signal regardless of picked-up objects. Such noises are called the fixed noise. As a fixed noise, there are, for example, noises caused by flaw or defect of semiconductor devices constituting light receiving elements, noises caused from lack of uniformity of light receiving cell pattern, switching noise, etc. These noises are generally called "Fixed Pattern Noise" (hereinafter abbreviated as FPN). Such an FPN is caused not only by the defect on the semiconductor devices and the non-uniformity of light receiving cell pattern, but also by a difference in off-set voltage of amplifying elements which are arranged in each light receiving cells, and a difference in gain of each amplifying elements.

FIG. 1 is a block diagram showing a constitution of a conventional solid state image sensor disclosed in Japanese Patent Publication Kokai No. 52-122038, in which said FPN is removed. The solid state image sensor comprises a light receiving section 1 having a plurality of light receiving cells arranged in matrix and a readout section 5 for reading image signals out of each light receiving cells. The readout section 5 comprises a horizontal scanning switch 2, a horizontal scanning shift register 3 for driving the horizontal scanning switch, and a vertical scanning shift register 4. The image signals read out by the readout section 5 are amplified in a pre-amplifier 6, and then are converted to digital image signals by an A/D converter 7. The digital image signal may be stored via a switch SL in a memory 8 which can store the image signals for a period corresponding to one horizontal line scanning period or one field scanning period. After storing the image signals in the memory 8, the switch SL is switched so that output signals from the A/D converter 7 and signals read out of the memory 8 are supplied to an operation circuit 9, and operation (addition, subtraction, multiplication or division) of these signals is done such that the image signals from which FPN is removed can be obtained. Furthermore, the thus obtained digital image signals are converted by a D/A converter 10 into analogue image signals. In this manner, the analogue image signals from which FPN has been removed can be obtained.

In the conventional solid state image sensor mentioned above, it is necessary to arrange the A/D converter 7, memory 8, operation circuit 9 and D/A converter 10 separately from the semiconductor substrate in which the light receiving section 1 and readout section 5 are formed, as a so-called external circuit. Therefore, the known solid state image sensor is liable to be complex in construction and large in size. In the known solid state image sensor, FPN is removed by operating the signals read out of the light receiving section 1 and the signals read out of the memory 8. In general, the memory 8 has only 8 bits per pixel to express 256 tones. Thus, the definition of quantization and the dynamic range are insufficient for removing FPN effectively, and thus the quality of the output image signal is low. In order to remove the FPN sufficiently and obtain a sufficiently wide dynamic range, it is necessary to express a pixel by ten to thirteen bits. Then, the constitution of solid state image sensor will be complex and the cost for manufacturing thereof will be high.

SUMMARY OF THE INVENTION

The object of the present invention is to provide a solid state image sensor in which FPN can be sufficiently removed by a simple constitution without the external circuit.

According to the present invention, a solid state image sensor comprises:

light receiving means including a plurality of light receiving cells arranged in matrix, each light receiving cells converting light input into electrical signals;

reading and storing means including a first memory for reading bright signals out of light receiving cells arranged in a row and storing the bright signal for a horizontal scanning period, a second memory for reading dark signals out of said light receiving cells arranged in a row and storing the dark signal for a horizontal scanning period, and a readout circuit for reading the bright and dark signals stored in said first and second memories simultaneously; and means for removing fixed pattern noises by processing the simultaneously read out bright and dark signals.

DESCRIPTION OF THE PREFERRED EMBODIMENTS

Figure 1:
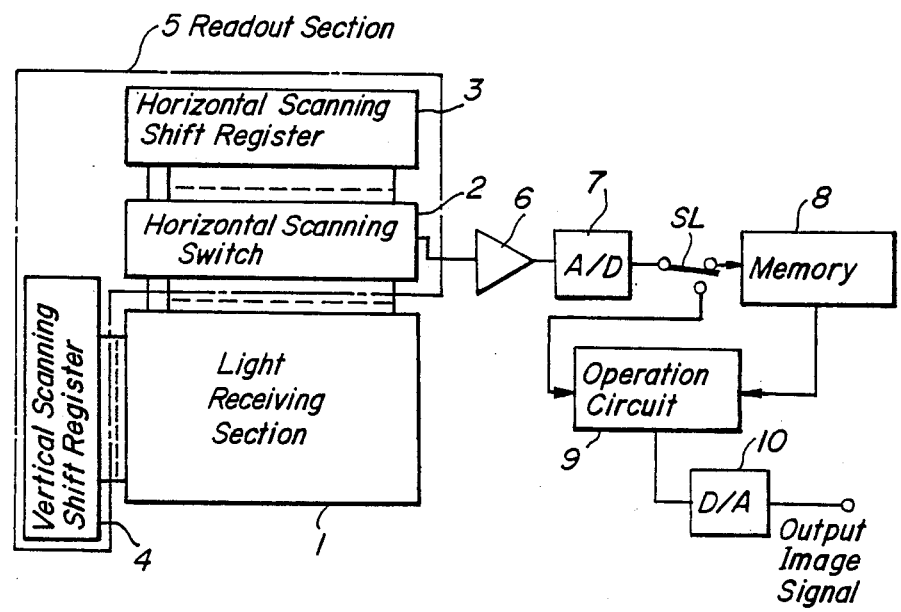
FIG. 1 is a block diagram showing the construction of the conventional solid state image sensor.
Figure 2:
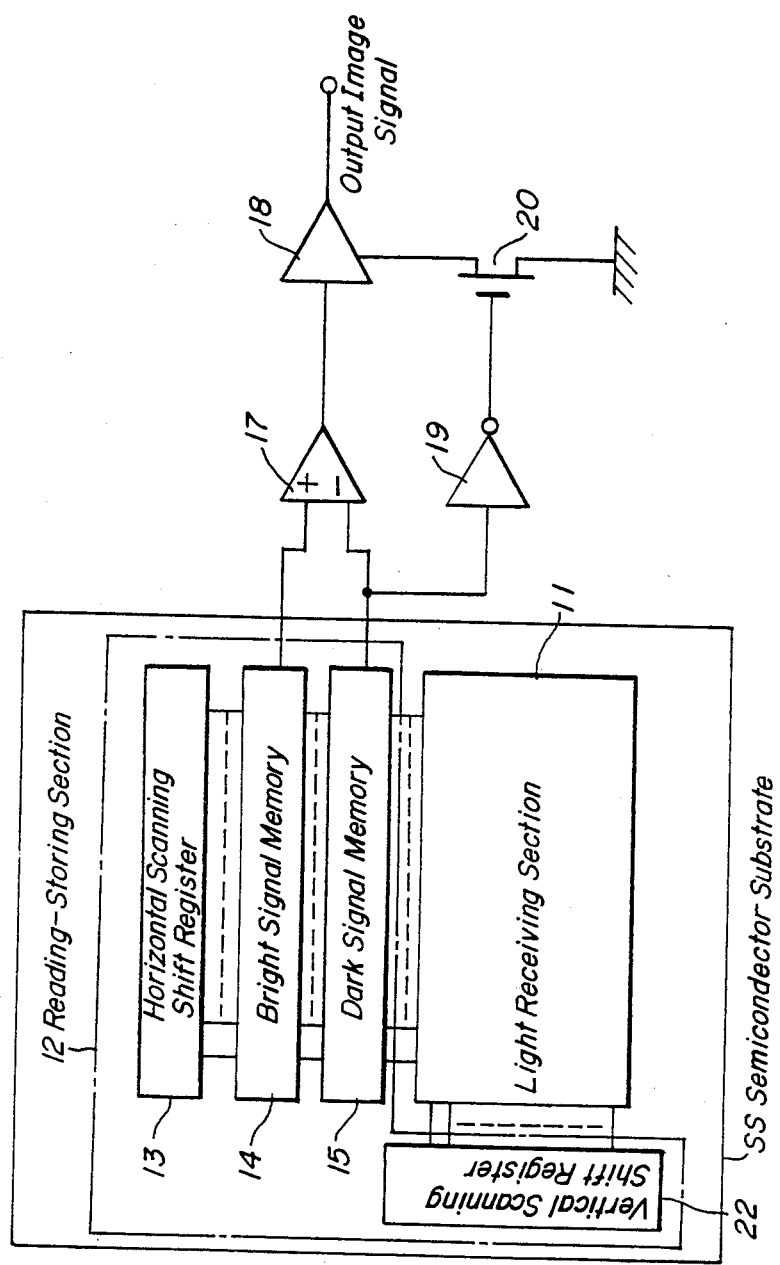
FIG. 2 is a block diagram illustrating the construction of an embodiment of the solid state image sensor according to the invention.

FIG. 2 is a block diagram showing an embodiment of the solid state image sensor according to the present invention. The solid state image sensor comprises a light receiving section 11 which includes a plurality of light receiving cells arranged in matrix, and a reading and storing section 12 for reading signals out of the light receiving cells and storing the thus readout signals. It should be noted that the light receiving section 11 and reading-storing section 12 are provided in one semiconductor substrate SS. The reading-storing section 12 comprises a horizontal scanning shift register 13, a first memory 14, which is driven by the horizontal scanning shift register to store, for one horizontal scanning period, bright signals, which are read out of the light receiving cells and have magnitudes corresponding to incident light input, a second memory 15 which is also driven by the horizontal scanning shift register and stores, for one horizontal scanning period, dark signals which are read out of the light receiving cells in the dark condition, and a vertical scanning shift register 22. As will be mentioned later, during a horizontal blanking period, from each light receiving cells arranged on the same horizontal line there are derived bright signals corresponding to photocarriers which have been stored in each of said cells for substantially one field period. After storing the bright signals in the first memory 14, the light receiving cells are reset to generate dark signals, and the dark signals thus generated are read out and stored in the second memory 15. During the next horizontal scanning period, the bright and dark signals stored in the first and second memories 14 and 15, respectively are simultaneously read out. In this embodiment, these bright and dark signals simultaneously read out from the reading-storing section 12 for each pixels successively are supplied to a differential amplifier 17 to derive a difference signal therebetween. In this manner FPN due to the difference in the off-set voltage of amplifying elements in each light receiving elements can be removed.

Furthermore, in order to remove the FPN due to the difference in the gain of amplifying elements in respective light receiving cells, the output of the differential amplifier 17 is supplied to a gain controller 18, and the dark signals read out of the second memory 15 are supplied via an amplifier 19 to a gate of a field effect transistor (FET) 20 whose source-drain path is connected to the control terminal of the gain controller 18. The gain of output signals from the differential amplifier 17 is controlled such that it becomes high when the level of dark signals is low, and becomes low when the level of dark signals is high. In this manner, FPN due to the difference in the gain of amplifying elements in each light receiving cells can be removed. It should be noted the grain of the gain controller 18 can be adjusted such that residual FPN becomes minimum by controlling the gain of amplifier 19 to adjust the magnitude of the signal applied to the gate of FET 20.

Figure 3:
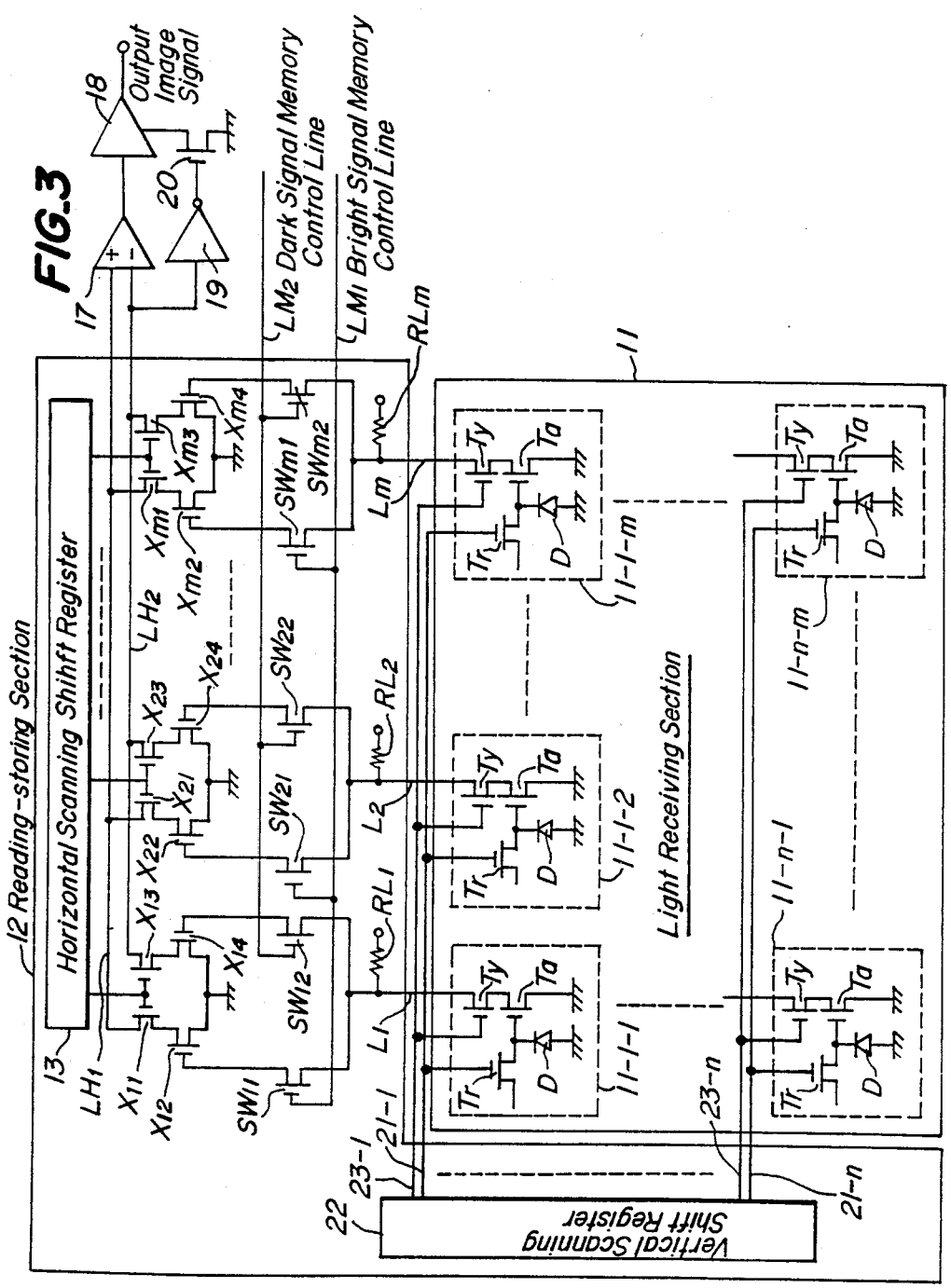
FIG. 3 is a circuit diagram depicting a detailed construction of the solid state image sensor shown in FIG. 2.

FIG. 3 is a circuit diagram showing the detail constitution of the light receiving section 1 and reading-storing section 12 of the solid state image sensor according to the present invention. In the light receiving section 11, a number of light receiving cells 11-1-1, 11-1-2, ... 11-1-$m$; 11-2-1, 11-2-2 ... 11-2-$m$; ... ; 11-$n$-1, 11-$n$-2 ... 11-$n$-$m$ are arranged in matrix of n rows and m columns. Since these cells have the common constitution, the construction of one light receiving cell will be explained in the following. The light receiving cell comprises a photodiode D constituting a photoelectric conversion element and three FETs Ta, Ty and Tr. Gates of all reset FETs Tr on the same row, i.e. on the same horizontal line are connected to a reset line 21-$i$ (i=1,2 ... n) which is connected to a vertical scanning shift register 22, and gates of all FETs Ty are connected to a line selection line 23-$i$ (i=1, 2 ... n) which is also connected to the vertical scanning shift register 22. When the vertical scanning shift register 22 supplies a reset signal on the reset line 21-1, the reset FETs Tr in the cells 11-1-1~11-1-$m$ in the same row are made conductive simultaneously, and photodiodes D in these cells are simultaneously reset. In each cell, the source-drain path of FET Ta is connected in series with that of FET Ty, and this series circuit is connected to a vertical signal line $L_i$ (i-1, 2 ... m). To the vertical signal lines $L_1, L_2 ... L_m$ are connected load resistors $RL_1, RL_2 ... RL_m$, respectively. Each vertical signal lines are further connected to respective one main electrodes of switching FETs $SW_{11}, SW_{12} ... SW_{m1}$ and are also connected to respective one main electrodes of FETs $SW_{12}, SW_{22} ... SW_{m2}$. The other main electrodes of FETs $SW_{11}, SW_{21} ... SW_{m1}$ are connected to the gates of memory FETs $X_{12}, X_{22}, ... X_{m2}$, respectively, which constitute the first memory for storing the bright signals, and the other main electrodes of FETs $SW_{12}, SW_{22} ... SW_{m2}$ are connected to the gates of memory FETs $X_{14}, X_{24}, X_{m4}$, respectively, which constitute the second memory for storing the dark signals. And, One main electrodes of FETs $X_{12}, X_{22}, ... X_{m2}$ and one main electrodes of FETs $X_{14}, X_{24} ... X_{m4}$ are commonly connected to the ground. The other main electrodes of FETs $X_{12}, X_{22} ... X_{m2}$ are connected to a first readout line $LH_1$ through switching FETs $X_{11}, X_{21} ... X_{m1}$ respectively, and the other main electrodes of FETs $X_{14}, X_{24}, ... X_{m4}$ are connected to a second readout line $LH_2$ through switching FETs $X_{13}, X_{23} ... X_{m3}$, respectively. The gates of these FETs $X_{11}, X_{21} ... X_{m1}$ and $X_{13}, X_{23} ... X_{m3}$ are commonly connected to each output lines of the horizontal scanning shift register 13. The first and second readout lines $LH_1$ and $LH_2$ are respectively connected to the positive and negative input terminals of the differential amplifier 17. Further, the gates of switching FET $SW_{11}, SW_{21} ... SW_{m1}$ are commonly connected to a first memory control line $LM_1$ and the gates of switching FETs $SW_{12}, SW_{22} ... SW_{m2}$ are commonly connected to a second memory control line $LM_2$.

Figure 4:
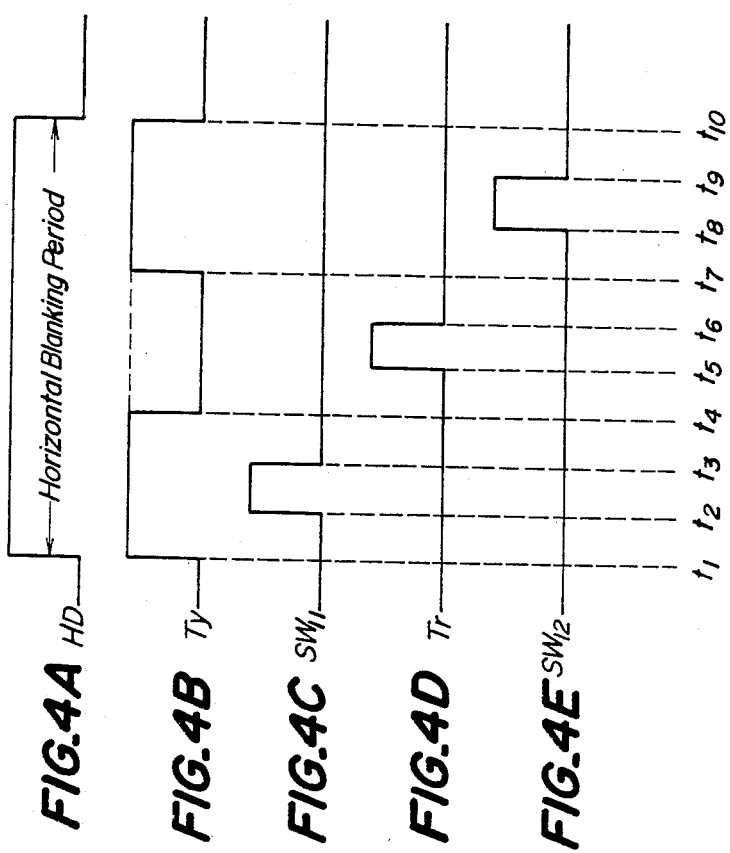
FIGS. 4A to 4E are timing charts to explain the operation of the solid state image sensor shown in FIG. 3.

The operation of the circuit shown in FIG. 3 will be explained in the following with reference to the waveforms shown in FIG. 4.

In a waveform of FIG. 4A, there is shown a horizontal blanking period of the horizontal driving signal HD. As shown in FIG. 4B, the vertical selection FETs Ty in each light receiving cells are simultaneously made conductive at the time of t1 during the horizontal blanking period, electric currents determined by the values of on-resistances of FETs Ta and Ty and the values of the load resistors $RL_1, RL_2 ... RL_m$ flow through respective road resistors. As a result, voltages having amplitudes in proportion to the currents passing there through are generated across respective load resistors $RL_1, RL_2 ... RL_m$.

Next, FETs $SW_{11}, SW_{21} ... SW_{m1}$ are made conductive during a time interval $t_2 \sim t_3$ as shown in FIG. 4C by supply a pulse On the first memory control line $LM_1$, so that the electric charges corresponding to the voltages generated across the load resistors $RL_1, RL_2 ... RL_m$ are stored in the gates of FETs $X_{12}, X_{22} ... X_{m2}$ via $SW_{11}, SW_{21} ... SW_{m1}$, respectively.

Next, after the FETs Ty are cut off at the time of $t_4$, the light receiving cells on the said line are simultaneously reset by making the reset FETs Tr conductive during a time period $t_5 \sim t_6$ as shown in FIG. 4D.

Next, the FETs Ty are made conductive again at the time of $t_7$ as shown in FIG. 4B, so that voltages determined by the voltages of photodiodes D are generated across the load resistors $RL_1, RL_2 ... RL_m$. And, the FETs $SW_{12}, SW_{22} ... SW_{m2}$ are made simultaneously conductive by supplying a pulse on the second memory control line $LM_2$ so that the electric charges corresponding to voltages generated across the load resistors $RL_1, RL_2 ... RL_m$ are stored in the gates of FETs $X_{14}$, $X_{24} ... X_{m4}$ via $SW_{12}, SW_{22} ... SW_{m2}$, respectively, and at the time of $t_{10}$, the FETs Ty are cut off again as shown in FIG. 4B. In such manner, the electric charges corresponding to photocarriers which have been accumulated in respective light receiving cells during one field or one frame period are stored in the gates of memory FETs $X_{12}, X_{22} \ldots X_{m2}$, and on the other hand, the electric charges corresponding to photocarriers which have been accumulated in respective cells for a very short period after resetting the photodiodes D are stored in the gates of memory FETs $X_{14}, X_{24} \ldots X_{m4}$. Then, the bright signals and the dark signals are simultaneously derived on the readout lines $LH_1$ and $LH_2$, respectively for respective pixels successively by reading the electric charges stored in the gates of the memory FETs $X_{11}, X_{13}; X_{21}, X_{23}; \ldots X_{m1}, X_{m3}$ under the control of the horizontal scanning shift register 13 during the next horizontal scanning period.

FPN due to the difference in the off-set voltage of the amplifying elements arranged in each light receiving cells can be removed by deriving a difference between the bright signals and dark signals by the differential amplifier 17.

Furthermore, the dark signals derived on the first readout line $LH_2$ are amplified by the amplifier 19 and the amplified signals are then supplied to the gate of FET 20, so that the gain of the gain controller 18 is controlled in accordance with the level of dark signals. Then, FPN due to the differences in gains of the amplifying elements in each light receiving cells can be compensated for.

The above-mentioned scanning is repeatedly effected for each of successive lines, and the output image signals from which FPNs have been removed to a large extent can be obtained.

In the above-mentioned explanation, FETs Ty are cut off while resetting the photodiodes D of the light receiving cells, but it is possible to remain FETs Ty conductive, as shown by a broken line in FIG. 4B. Also, in the above-explained embodiment, after removing the FRN due to the differences in off-set voltage, the FPN due to the difference in the gain is removed, but it is possible to reverse this order. Moreover, the operation of the bright and dark signals in order to remove the FPN is not limited to the embodiment mentioned above, but various modifications are possible.

Figure 5:
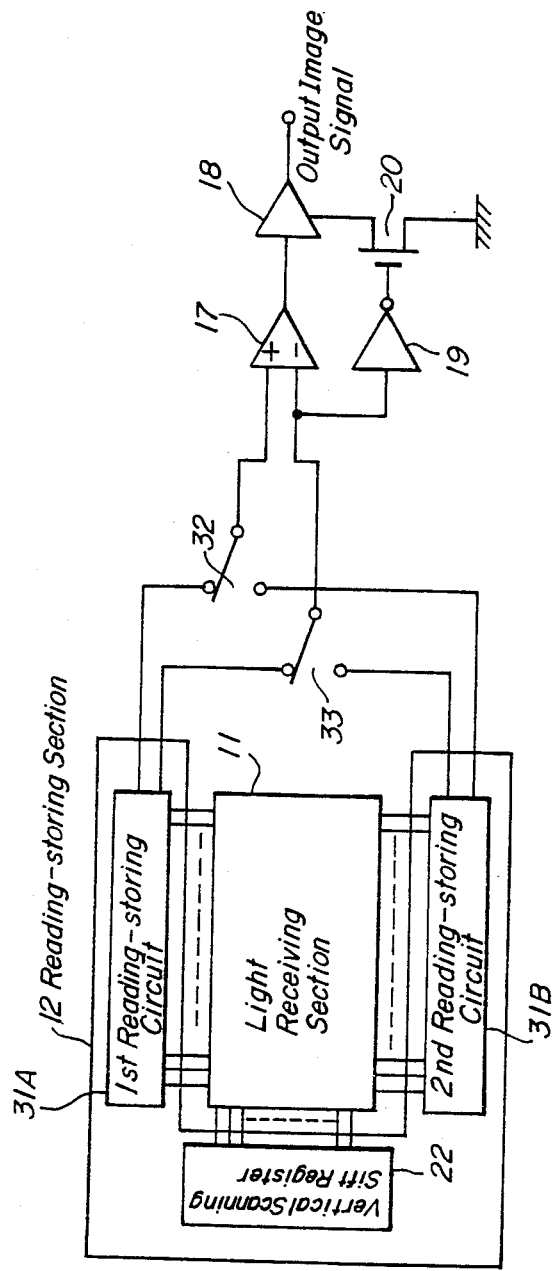
FIG. 5 is a block diagram illustrating the construction of another embodiment of the solid state image sensor according to the present invention.

FIG. 5 shows a block diagram illustrating another embodiment of the solid state image sensor according to the present invention. In this figure, the same numerical numbers are used for denoting the same portions as those of the above-mentioned embodiment. The solid state image sensor according to this embodiment comprises first and second horizontal reading-storing circuits 31A and 31B. When signals are read out of one horizontal reading storing circuit, the bright and dark signals are stored in the other horizontal reading-storing circuit. That is to say, while the first horizontal reading-storing circuit 31A supplies bright and dark signals on a scanning line $2k$ during a horizontal scanning period $TH2k$, the second horizontal reading-storing circuit 31B reads bright and dark signals out of light receiving cells on the next scanning line $2k+1$ and stores these signals therein.

According to such an arrangement, since the time for reading the signals from the light receiving section 11 becomes longer, that is to say, from the horizontal blanking period to the one horizontal scanning period, there is an advantage that the strict requirement with respect to the frequency characteristics is not imposed upon to the elements in cells.

In this embodiment, since it is necessary to turn the functions of first readout circuit 31A and second read-out circuit 31B alternately, switches 32 and 33 are arranged therefor. These switches 32 and 33 are turned at the rhythm of the horizontal scanning period, so that bright signals are always supplied into the positive input terminals of the differential amplifier 17 and dark signals are always supplied into the negative input terminal thereof.

As clearly understood from the above, in the solid state image sensor according to the invention, since dark signals which are not influenced by light input and bright signals are simultaneously read out and FPNs are removed by addition, subtraction, multiplication and division of these analogue signals, not only FPNs with high level but also FPNs with low level, which could not be removed in the known sensor, can be precisely removed. That is to say, FPNs can be removed with a high precision equivalent to $10 \sim 13$ bits per pixel in case of calculating these analogue signals to digital signals. Therefore, there is so great effect to remove FPNs that a high image quality can be obtained.

Also, according to the present invention, since two memories respectively having capacities to store image signals for one horizontal scanning period are formed on the same and single semiconductor substrate together with light receiving section, no external circuit such as A/D converter and memories is necessary. Therefore, the solid state image sensor can be simple in structure, compact in size and light in weight. Moreover, the amount of consumption of power of the camera as a whole can be decrease accordingly, and thus it is possible to manufacture a compact television camera which may be driven by a battery.

What is claimed is:

1. A solid state image sensor comprising:
   light receiving means including a plurality of light receiving cells arranged in matrix, each light receiving cells converting light input into electrical signals;
   reading and storing means including a first memory for reading bright signals out of light receiving cells arranged in a row and storing the bright signal for a horizontal scanning period, a second memory for reading dark signals out of said light receiving cells arranged in a row and storing the dark signal for a horizontal scanning period, and a readout circuit for reading the bright and dark signals stored in said first and second memories simultaneously; and
   means for removing fixed pattern noises by processing the simultaneously read out bright and dark signals.

2. A solid state image sensor according to claim 1, wherein said light receiving means and reading and storing means are integrally formed in the same semiconductor substrate.

3. A solid state image sensor according to claim 1, wherein said means for removing the fixed pattern noises comprises a differential amplifier for deriving a difference between the bright and dark signals so that the fixed pattern noise due to the difference in off-set voltage of the light receiving cells is removed.

4. A solid state image sensor according to claim 1, wherein said fixed pattern noise reducing means comprises an amplifier for amplifying the dark signals to generate a gain control signal and a gain controller having an input for receiving the bright signal and a control input for receiving the gain control signal for controlling the gain of the bright signals such that the fixed pattern noise due to the difference in gain of amplifying elements in the light receiving cells is removed.

5. A solid state image sensor according to claim 1, wherein said reading and storing means comprises
- a first set of switching transistors, the number of which is equal to that of light receiving cells arranged in a row, each switching transistor having two main electrodes and a control electrode;
- a second set of switching transistors, the number of which is equal to that of the light receiving cells arranged in a row, each switching transistor having two main electrodes and a control electrode;
- a first store control line commonly connected to the control electrodes of said first set of switching transistors;
- a second store control line commonly connected to the control electrodes of said second set of switching transistors;
- a plurality of vertical lines each of which has one end connected to signal output terminals of light receiving cells arranged in respective columns and has the other end connected commonly to one main electrodes of the first and second sets of switching transistors;
- a plurality of load resistors each connected across respective vertical lines and a voltage supply source;
- a first set of memory transistors for storing the bright signals read out of light receiving cells arranged in a row, each of which has a control electrode connected to the other main electrode of each of the first set of switching transistors;
- a second set of memory transistors for storing the dark signals read out of light receiving cells arranged in a row, each of which has a control electrode connected to the other main electrode of each of the second set of switching transistors;
- a third set of switching transistors each of which has a control electrode, two main electrodes one of which is connected to the other main electrode of corresponding one of the first memory transistors;
- a fourth set of switching transistors each of which has a control electrode, two main electrodes one of which is connected to the other main electrode of corresponding one of the second memory transistors;
- a bright signal readout line commonly connected to the other main electrode of the third set of switching transistors;
- a dark signal readout line commonly connected to the other main electrode of the fourth set of switching transistors;
- a horizontal scanning shift register having output terminals which are connected to the commonly connected control electrode of the third and fourth switching transistors; and
- a vertical scanning shift register having output terminals each connected to light receiving cells arranged in respective row.

6. A solid state image sensor according to claim 5, wherein said dark signals are read out of light receiving cells arranged in a row immediately after resetting the light receiving cells simultaneously during a horizontal blanking period.

7. A solid state image sensor according to claim 5, wherein said bright signals are read out of light receiving cells arranged in a row simultaneously during a horizontal blanking period.

8. A solid state image sensor according to claim 1, wherein
said reading and storing means comprises
- a third memory for reading bright signals out of light receiving cells arranged in a row and storing the bright signal for the horizontal scanning period;
- a fourth memory for reading dark signals out of light receiving cells arranged in a row and storing the dark signal for the horizontal scanning period;
- switching means for deriving the bright and dark signals alternately from said first and second memories and the said third and fourth memories in the rhythm of the horizontal scanning period.

9. A solid state image sensor according to claim 8, wherein said bright and dark signals are read out of light receiving cells in a row successively during one horizontal scanning period.

10. A solid state image sensor according to claim 9, wherein said means for removing the fixed pattern noises comprises a differential amplifier for deriving a difference between the bright and dark signals so that the fixed pattern noise due to the difference in off-set voltage of the light receiving cells is removed.

11. A solid state image sensor according to claim 9, wherein said fixed pattern noise reducing means comprises an amplifier for amplifying the dark signals to generate a gain control signal and a gain controller having an input for receiving the bright signal and a control input for receiving the gain control signal for controlling the gain of the bright signals such that the fixed pattern noise due to the difference in gain of amplifying elements in the light receiving cells is removed.

* * * * *